(12) United States Patent
Verma et al.

(10) Patent No.: US 8,543,518 B2
(45) Date of Patent: Sep. 24, 2013

(54) DEDUCING SHADOW USER PROFILES FOR AD CAMPAIGNS

(75) Inventors: Amit Kumar Verma, Bangalore (IN); Viswanathan Ramaiyer, Bangalore (IN); Hastagiri Prakash, Bangalore (IN)

(73) Assignee: Yahoo! Inc., Sunnyvale, CA (US)

( * ) Notice: Subject to any disclaimer, the term of this patent is extended or adjusted under 35 U.S.C. 154(b) by 405 days.

(21) Appl. No.: 12/843,762

(22) Filed: Jul. 26, 2010

(65) Prior Publication Data

US 2012/0023046 A1 Jan. 26, 2012

(51) Int. Cl.
*G06F 17/30* (2006.01)
*G06F 15/18* (2006.01)

(52) U.S. Cl.
USPC .................................................. 706/12

(58) Field of Classification Search
USPC ................... 706/12; 707/2, 5, 736
See application file for complete search history.

(56) References Cited

U.S. PATENT DOCUMENTS 6,026,397 A * 2/2000 Sheppard ............................. 1/1

* cited by examiner

*Primary Examiner* — Jeffrey A Gaffin
*Assistant Examiner* — Ola Olude Afolabi
(74) *Attorney, Agent, or Firm* — Mauriel Kapouytian Woods LLP; James Woods

(57) ABSTRACT

A method and a system are provided for deducing shadow user profile attributes for ad campaigns aimed at target users. In one example, the system extracts tagged data from source data. The tagged data includes label information associated with an actual profile for a user. The tagged data is associated with the user. The system prepares the tagged data by splitting the tagged data into datasets, including at least training data and test data. The system generates one or more individual models based on the tagged data, wherein the one or more individual models provide the ability to deduce attributes of a profile for the user. The system then generates a composite model based on the individual models. The composite model includes a combination of the individual models that are associated with the user. The system may charge a premium for ad campaigns that are aimed at target users who are each assigned one or more shadow profile attribute values. The system may determine the premium based on the confidence level with which the one or more attribute values fits to the one or more users. The system is applicable to both display advertising and sponsored search advertising.

21 Claims, 4 Drawing Sheets

DEDUCING SHADOW USER PROFILES FOR AD CAMPAIGNS

FIELD OF THE INVENTION

The invention relates to online advertising. More particularly, the invention relates to deducing shadow user profiles for ad campaigns aimed at target users.

BACKGROUND

An advertiser, such as Ford™ or McDonald's™, generally contracts a creative agency for ads to be placed in various media for the advertiser's products. Such media may include TV, radio, Internet ads (e.g., sponsored search ads, banner display ads, textual ads, streaming ads, mobile phone ads, etc.) or print medium ads (e.g., ads in newspapers, magazines, posters, etc.). It is quite possible that the advertiser may engage one or more creative agencies that specialize in generating ads for one or more of the above media. A company wants to show the most relevant ads to end users in order to get the most value from their ad campaign.

Ads aimed at targeted users are prevalent in display advertising, which deals primarily with display ads (e.g., banner ads, etc.) published on pages of a portal web site (e.g., http://www.Yahoo.com). Ads aimed at targeted users may also appear on a page that includes sponsored search results. In early forms, sponsored search marketplaces, such as those provided by search engines like Yahoo!™, included ranking and pricing of ads based solely on advertisers' bid amounts associated with the keywords in a sponsored search auction. Display advertising and sponsored search are enormously profitable business sectors for marketplace providers, such as search engines like Yahoo!™.

However, marketplace provider (or search engine) revenue was influenced not only by bid amounts, but also by click-through-rates associated with the served ads. Recognizing this, ranking and pricing methods arose in which not only bid amount, but also click-through-rates associated with ads, became utilized as factors influencing ad ranking and pricing in sponsored search. By bringing the focus more on, and substantially increasing, search engine revenue, this new approach to ranking and pricing led to a huge increase in search engine profit from the already hugely profitable business of sponsored search. In addition, it may be viewed that, by increasing user clicks on ads, this change of focus and methodology also led to a more efficient, and healthier sponsored search marketplace overall, for the search engine, the advertisers, and the users (e.g., consumers).

In sponsored search, as in any other marketplaces, a company like Yahoo!™ must face limited resources and ever demanding market requirements. The inventory includes all advertising slots on search result pages. While the total supplies of slots may be large, the relevant and heavily searched and clicked slots are precious. Search engines face the challenge of placing the right ads in the right slots and maximize the utilization of the inventory.

Accordingly, advertisers are more and more interested in directing their ads to a target user segment. However, a number of users do not specify enough information about their profile. For example, about 50% of Yahoo!™ users do not specify their gender. As a result, it is difficult to target these users in aimed ad campaigns.

SUMMARY

What is needed is an improved method having features for addressing the problems mentioned above and new features not yet discussed. Broadly speaking, the invention fills these needs by providing a method and a system for deducing shadow user profiles for ad campaigns aimed at target users.

In a first embodiment, a computer-implemented method is provided for deducing one or more user profile attributes. The method comprises the following: extracting, at a computer, tagged data from source data, wherein the tagged data includes label information associated with an actual profile for a user, and wherein the tagged data is associated with the user; preparing, at a computer, the tagged data by splitting the tagged data into datasets, including at least training data and test data; generating, at a computer, one or more individual models based on the tagged data, wherein the one or more individual models provide the ability to deduce attributes of a profile for the user; and generating, at a computer, a composite model based on the individual models, wherein the composite model includes a combination of the individual models that are associated with the user.

In a second embodiment, a system is provided for deducing one or more user profile attributes. The system comprises a computer system configured for the following: extracting tagged data from source data, wherein the tagged data includes label information associated with an actual profile for a user, and wherein the tagged data is associated with the user; preparing the tagged data by splitting the tagged data into datasets, including at least training data and test data; generating one or more individual models based on the tagged data, wherein the one or more individual models provide the ability to deduce attributes of a profile for the user; and generating a composite model based on the individual models, wherein the composite model includes a combination of the individual models that are associated with the user.

In a third embodiment, a computer readable medium is provided comprising one or more instructions for deducing one or more user profile attributes. The one or more instructions are configured for causing one or more processors to perform at least the following steps: extracting tagged data from source data, wherein the tagged data includes label information associated with an actual profile for a user, and wherein the tagged data is associated with the user; preparing the tagged data by splitting the tagged data into datasets, including at least training data and test data; generating one or more individual models based on the tagged data, wherein the one or more individual models provide the ability to deduce attributes of a profile for the user; and generating a composite model based on the individual models, wherein the composite model includes a combination of the individual models that are associated with the user.

The invention encompasses other embodiments configured as set forth above and with other features and alternatives. It should be appreciated that the invention may be implemented in numerous ways, including as a method, a process, an apparatus, a system or a device.

BRIEF DESCRIPTION OF THE DRAWINGS

The invention will be readily understood by the following detailed description in conjunction with the accompanying drawings. To facilitate this description, like reference numerals designate like structural elements.

DETAILED DESCRIPTION

Figure 1:
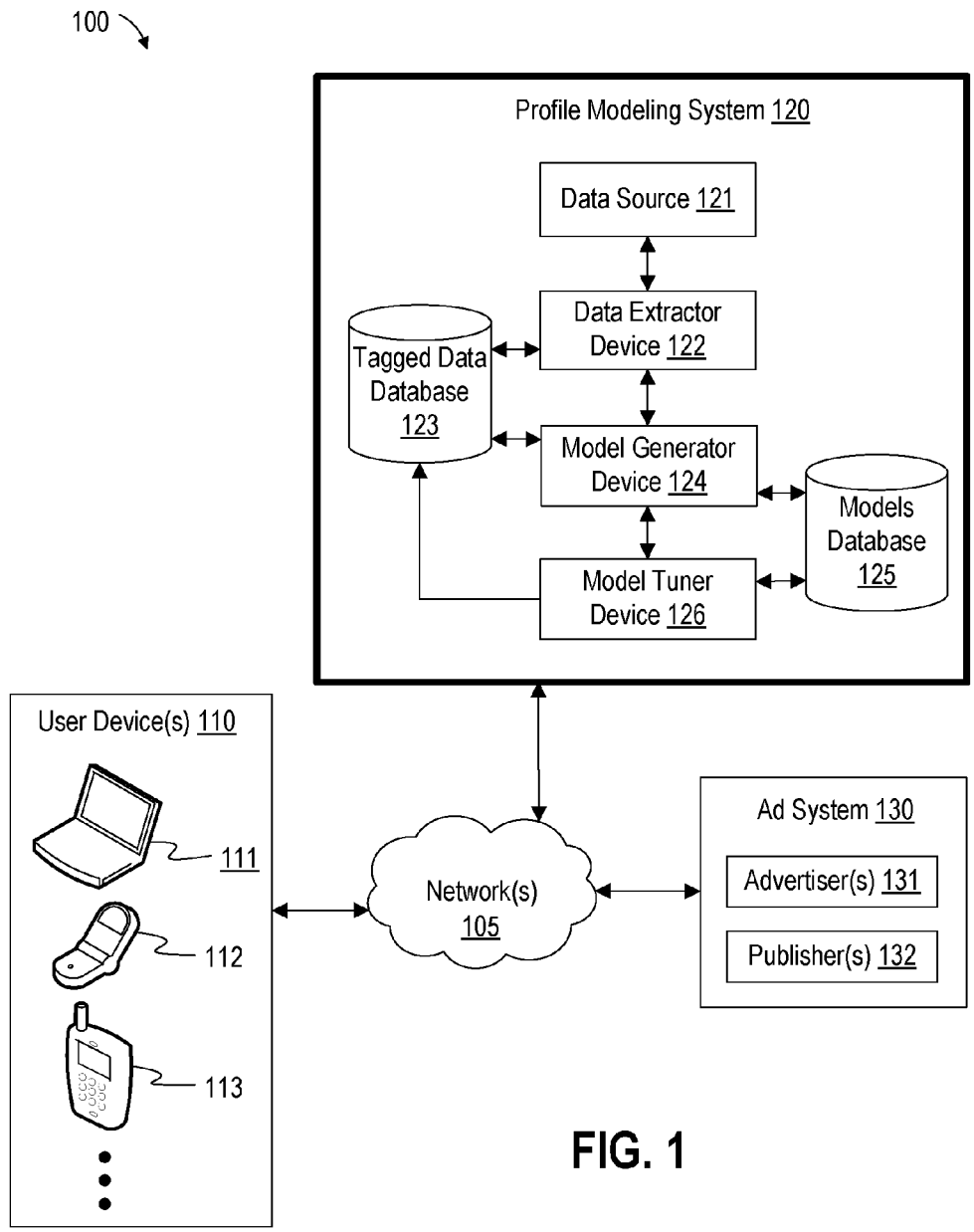
FIG. 1 is a high-level block diagram of a system 100 for deducing user profile attributes for aiming online ads at target users, in accordance with some embodiments.

An invention is disclosed for a method and a system for deducing shadow user profile attributes for ad campaigns aimed at target users. Numerous specific details are set forth in order to provide a thorough understanding of the invention. It will be understood, however, to one skilled in the art, that the invention may be practiced with other specific details.

Definitions

Some terms are defined below in alphabetical order for easy reference.

These terms are not rigidly restricted to these definitions. A term may be further defined by the term's use in other sections of this description.

"Ad" (e.g., ad, item and/or message) means a paid announcement, as of goods or services for sale, preferably on a network, such as the Internet. An ad may also be referred to as an ad, an item and/or a message.

"Ad Server" is a server that is configured for serving one or more ads to user devices. An ad server is preferably controlled by a publisher of a Web site and/or an advertiser of online ads. A server is defined below.

"Advertiser" (e.g., messenger and/or messaging customer, etc.) means an entity that is in the business of marketing a product and/or a service to users. An advertiser may include without limitation a seller and/or a third-party agent for the seller. An advertiser may also be referred to as a messenger and/or a messaging customer. Advertising may also be referred to as messaging.

"Advertising" means marketing a product and/or service to one or more potential consumers by using an ad. One example of advertising is publishing a sponsored search ad on a Web site.

"Application server" is a server that is configured for running one or more devices loaded on the application server. For example, an application server may run a device configured for deducing shadow profiles.

"Client" means the client part of a client-server architecture. A client is typically a user device and/or an application that runs on a user device. A client typically relies on a server to perform some operations. For example, an email client is an application that enables a user to send and receive e-mail via an email server. The computer running such an email client may also be referred to as a client.

"Database" (e.g., database system, etc.) means a collection of data organized in such a way that a computer program may quickly select desired pieces of the data. A database is an electronic filing system. In some instances, the term "database" is used as shorthand for "database management system".

"Data source" means a feed of a data for a modeling system. Examples of a data source include without limitation search history, browsing history, ad-click history, group memberships, user-expressed interests, mail/IM (e.g., mail/instant message).

"Device" means hardware, software or a combination thereof. A device may sometimes be referred to as an apparatus. Examples of a device include without limitation a software application such as Microsoft Word™, a laptop computer, a database, a server, a display, a computer mouse and/or a hard disk.

"Item" means an ad, which is defined above.

"Marketplace" means a world of commercial activity where products and/or services are browsed, bought and/or sold, etc. A marketplace may be located over a network, such as the Internet. A marketplace may also be located in a physical environment, such as a shopping mall.

"Message" means an ad, which is defined above.

"Messaging" means advertising, which is defined above.

"Messenger" means an advertiser, which is defined above.

"Network" means a connection, between any two or more computers, that permits the transmission of data. A network may be any combination of networks, including without limitation the Internet, a local area network, a wide area network, a wireless network and a cellular network.

"Profile" (e.g., user profile) means a list of user attributes, which may include without limitation gender, age group, income level, etc. A regular profile (e.g., preexisting profile and/or user-defined profile) is a profile that is filled-in by a user. A shadow profile is a combination of a regular profile and attributes obtained from machine learning of user interactions on a network.

"Publisher" means an entity that publishes, on a network, a Web page having content and/or ads, etc.

"Server" means a software application that provides services to other computer programs (and their users), in the same computer or other computer. A server may also refer to the physical computer that has been set aside to run a specific server application. For example, when the software Apache HTTP Server is used as the Web server for a company's Web site, the computer running Apache may also be called the Web server. Server applications may be divided among server computers over an extreme range, depending upon the workload.

"Software" means a computer program that is written in a programming language that may be used by one of ordinary skill in the art. The programming language chosen should be compatible with the computer by which the software application is to be executed and, in particular, with the operating system of that computer. Examples of suitable programming languages include without limitation Object Pascal, C, C++ and Java. Further, the functions of some embodiments, when described as a series of steps for a method, could be implemented as a series of software instructions for being operated by a processor, such that the embodiments could be implemented as software, hardware, or a combination thereof. Computer readable media are discussed in more detail in a separate section below.

"System" means a device or multiple coupled devices. A device is defined above.

"User" (e.g., consumer, etc.) means an operator of a user device. A user is typically a person who seeks to acquire a product and/or service. For example, a user may be a woman who is browsing Yahoo!™ Shopping for a new cell phone to replace her current cell phone. The term "user" may refer to a user device, depending on the context.

"User device" (e.g., computer, user computer, client and/or server, etc.) means a single computer or to a network of interacting computers. A user device is a computer that a user may use to communicate with other devices over a network, such as the Internet. A user device is a combination of a hardware system, a software operating system and perhaps one or more software application programs. Examples of a user device include without limitation a laptop computer, a palmtop computer, a smart phone, a cell phone, a mobile phone, an IBM-type personal computer (PC) having an operating system such as Microsoft Windows™, an Apple™ computer having an operating system such as MAC-OS, hardware having a JAVA-OS operating system, and a Sun Microsystems Workstation having a UNIX operating system.

"Web browser" means a software program that may display text, graphics, or both, from Web pages on Web sites. Examples of a Web browser include without limitation Mozilla Firefox™ and Microsoft Internet Explorer™.

"Web page" means documents written in a mark-up language including without limitation HTML (hypertext mark-up language), VRML (virtual reality modeling language), dynamic HTML, XML (extended mark-up language) and/or other related computer languages. A Web page may also refer to a collection of such documents reachable through one specific Internet address and/or through one specific Web site. A Web page may also refer to any document obtainable through a particular URL (Uniform Resource Locator).

"Web portal" (e.g., public portal) means a Web site or service that offers a broad array of resources and services, such as, for example, e-mail, forums, search engines, and online shopping malls. The first Web portals were online services, such as AOL, that provided access to the Web. However, now, most of the traditional search engines (e.g., Yahoo!™) have transformed themselves into Web portals to attract and keep a larger audience.

"Web server" is a server configured for serving at least one Web page to a Web browser. An example of a Web server is a Yahoo!™ Web server. A server is defined above.

"Web site" means one or more Web pages. A Web site preferably includes plurality of Web pages, virtually connected to form a coherent group.

General Overview

A number of visitors to websites do not specify sufficient information about their profile, such as their gender, age, etc. By one study, roughly 50% of users do not specify their gender, for example. Advertisers, on the other hand, would like to direct their ads as accurately as possible to a target user segment.

A web portal company like Yahoo!™ stands to gain a lot if the company may fit a shadow profile (e.g., computed profile) to a user and prove the accuracy of the fit. The web portal company will have a larger user base available for fine-grained targeting.

The web portal company may then open up these shadow profiles for advertisers to use in aimed ad campaigns. Depending on the accuracy of the fit, as determined by the web portal company and communicated to the advertisers, the web portal company may charge a suitable premium for targeting these users. The premium should be proportional to the accuracy and confidence level of the fit. This will help increase the target user segment base and lead to increased advertising revenue. The advertisers stand to benefit with increased return on investment because they may now reach their goals while limiting the ads to specific target segments.

The network effect of happy advertisers will help bring in more revenue for the web portal company. Overall, this will be a win-win situation for both the web portal company and the advertisers.

Note that the present system is not the same as tracking behavior of a user and showing ads that suit the computed "interests" of the user. Such techniques, in general, are more suitable for performance-based campaigns where the advertiser preferably pays when the system has received from the user device an ad-related action, such as, for example, a click on an ad, a purchase, etc. The present system, in contrast, is more general and may be used for emotional-brand campaigns as well as performance-based campaigns. Note that an ad campaign for a brand typically has a primary requirement that an ad is sent to a user device; in such a case, the advertiser is typically contracted to pay irrespectively of whether the user device performs an ad-related action (e.g., click on ad, or other action). In particular, the system is configured for exposing the computed user profile attributes to advertisers for generating aimed ad campaigns.

Architecture Overview

FIG. 1 is a high-level block diagram of a system 100 for deducing user profile attributes for aiming online ads at target users, in accordance with some embodiments. The one or more networks 105 couple together one or more user devices 110, an ad system 130, and a modeling system 130. The network 105 may be any combination of networks, including without limitation the Internet, a local area network, a wide area network, a wireless network and/or a cellular network.

Each user device 110 includes without limitation a single computer or a network of interacting computers. Examples of a user device include without limitation a laptop computer 111, a cell phone 112 and a smart phone 113. A user may communicate with other devices over the network 105 by using a user device 110. A user may be, for example, a person browsing or shopping in a marketplace on the Internet.

The profile modeling system 120 performs more important operations of the system 100 and is described further below in other sections. The profile modeling system 120 may include without limitation application servers, search engines, Web servers, and/or databases. In particular, the profile modeling system 120 includes without limitation the following coupled devices: a data source 121, a data extractor device 122, a tagged data database 123, a model generator device 124, a models database 125, and a model tuner device 126. The modeling system 140 is configured for communicating with the ad system 130, which includes one or more advertisers 131 and one or more publishers 132. The modeling system 140 is further configured for communicating with the one or more user devices 110 and serving at least one Web page to a Web browser on a user device 110.

The profile modeling system 120 is configured with programs, algorithms, applications, software, graphical user interfaces, models, other tools and/or other procedures necessary to implement and/or facilitate methods and systems according to embodiments of the invention, or computerized aspects thereof, whether on one computer or distributed among multiple computers or devices. These include local and global adjustment, decision making, or optimizations, weighting, pricing, allocation, scheduling, serving, and/or other techniques. In various embodiments, the elements of the profile modeling system 120 may exist on one computer, or may exist on multiple computers, devices and/or locations.

The ad system 130 may also include without limitation ad servers, application servers and/or databases. The ad system 130 is configured for serving one or more ads to the user devices 110. An ad system 130 is preferably controlled by an advertiser 131 of online ads and/or a publisher 132 of a Web site. An advertiser 131 is an entity that is seeking to market a product and/or a service to users at the user devices 110. Examples of a publisher/advertiser include without limitation Amazon.com™, Nike™ and Yahoo!™. A publisher 132 is an entity that publishes, over the network 105, a Web page having content and/or ads.

The configuration of the system 100 in FIG. 1 is for explanatory purposes. For example, in some embodiments, the advertiser system 130 may be part of an ad exchange. For example, some Web portals operate, utilize, or facilitate advertising exchanges. Such exchanges may virtually connect parties including advertisers, publishers, networks of advertisers, networks of publishers, and other entities. The exchange may facilitate arrangements, bidding, auctioning in connection with ads and ad campaigns, and may also facilitate planning and serving of ads. Ads that may be included within the exchange may include display or graphical ads that are not served in connection with user searches including keyword-based searches. The exchange may also include sponsored search ads, including ads served in association with user searches, such as keyword searches. Any type of simple or sophisticated ads may be included, such as text, graphic, picture, video and audio ads, streaming ads, interactive ads, rich median ads, etc.

In some embodiments, active ads are ads that are available for serving on or in connection with the exchange, whereas non-active ads are not so available. For example, non-active ads may include ads that are in review prior to be available for serving. This may include review as part of an editorial process to try to ensure or reduce the chance that inappropriate or dangerous ads are not allowed to be active. There are numerous other configurations in other embodiments that are possible.

Deducing Shadow Profiles

The system is configured for fitting shadow profiles (e.g., computed profiles) to users, verifying accuracy for the fitted profiles, and using these shadow profiles in aimed advertising campaigns to increase both a web portal company's revenue and advertisers' revenues.

For each user, the web portal company may maintain a regular user profile that is visible to the user. Attributes contained in this profile may include without limitation gender, age group, income level, etc. These attributes are explicitly specified by the users, typically during registration time. A large percentage of users do not fill in many of these attributes, neither during registration nor during a later time. If a user has not filled in an attribute (e.g., gender) that is used in an advertising campaign for females, then that user is not a candidate for showing ads from that campaign. This limits the number of users who are available for various targeted advertising campaigns.

The present system is configured for maintaining a shadow profile for each user. This shadow profile may or may not have attributes that are substantially similar to the attributes of the existing regular profile. The shadow profile is not visible to the user. The shadow profile is internal to web portal company. Note that a regular profile (e.g., preexisting profile or user-defined profile) is distinguished from a shadow profile that is introduced by the present system. The system is configured for using machine learning techniques to add attributes and values to regular profiles in order to generate shadow profiles.

Through machine learning techniques that analyze user behavior, the system is configured for filling in values for attributes in the shadow profile. Note that the shadow profile may agree with the regular profile on some of the attributes, may contradict the regular profile on some other attributes, and may contain values for attributes that are empty in the regular profile. In all cases, a confidence interval and confidence level will be maintained for each attribute that has a value. For example, the system may determine that a gender for a particular user is 70-80% male with 95% confidence.

The confidence intervals and levels are updated on a periodic basis (e.g., minutely, hourly, daily, monthly, etc.) as the system learns more and more about the user behavior over time. When the system reaches sufficient levels of accuracy and confidence (e.g., 95% confidence that the user is 80% male and 20% female), the system may declare that the system has learned enough about the user's gender and that the user may be used for gender-based targeting.

The system uses data sources (e.g., user features) for deducing the user profile attributes. For example, the search history, browsing pattern, ad-click history, group memberships, user-expressed interests, and mail/IM (e.g., mail/instant message) records are candidates to consider for the data sources. Through cookie sharing mechanisms, the system may look at the history on a web portal company's sites, as well as the company's partner sites, to increase the pace of learning.

A web portal company may provide content that is specifically aimed at certain user segments, such as, for example, teens, homemakers, males with high income, etc. The system may use the click behavior in the source data 121 to deduce, with higher confidence, the segment to which the user belongs.

The system may also use the non-click history to deduce negative reinforcements for the learning algorithm. For example, a user who never clicked on articles specifically tagged for females is probably not a female. This may help the system boost the confidence level of the system's algorithm predictions. Such techniques need to be employed carefully to avoid handling an explosion of data. Accordingly, for negative reinforcements, it may make sense to use only articles with a strong bias toward a particular profile.

The ad systems, like the ad system 130 of FIG. 1, should take into account targeting that is based on attributes that are somewhat "fuzzy" in their values (e.g., 95% male with 98% confidence). In some embodiments, the system is configured for providing to advertisers a user interface that is simplified. All the details of the shadow profiles are preferably not shown to the advertisers. Instead, the system presents simplified descriptions, such as, for example, "Males, High Confidence", "Females, Medium Confidence", etc., thus hiding too many statistical details.

Machine Learning Techniques for Deducing Shadow Profiles

In this section, initial ideas are presented on the implementation of the machine learning mechanism to deduce the user profile attributes. This solution is, by no means, the only solution possible and is included as an illustration of how some of the techniques mentioned in the disclosure would work.

It is assumed throughout that the system may share cookies among all sub-domains of the web portal company. One of the key advantages of this technique is that the system will be able to attach the contents of the regular profile to all cookies of properties of the web portal company. Thus, the system may gain valuable training data for machine learning algorithms even when the user is visiting properties of the web portal company while the user is logged out of the web portal.

Important source data may include without limitation the following: search history, browsing history, ad-click history, group memberships, user-expressed interests, and mail/IM records (e.g., email/instant message records)

Search history may include without limitation the complete search history and/or just an indicative table that tells the system the search query patterns (e.g., topical/concept histogram) of a particular user.

Browsing pattern may be obtained from just within properties of the web portal company, or may include without limitation visits to other sites who act as publishers for ads of the web portal company. For example, if the user visits CNN.com, the system may get the info as the page on cnn.com redirects the advertisement parts of the page to the system, and the system has the profile information of the user because the cookies are shared across the sub-domains of the system. Again, browsing pattern may include without limitation an exhaustive list or a topical/concept histogram.

Ad-Click history is an important component in the data collection stage. This data includes without limitation a history of the ads that the user clicked on either properties of the web portal company or publisher websites.

Group Memberships may include without limitation various groups to which the user has subscribed. Examples of such group may include without limitation a news group, a sports group, a movies group, etc.

User-expressed Interests may include without limitation items in which the user the user has indicated an interest. For example, the user may be shopping and may press a "thumbs up" icon to indicate that the user likes a particular digital camera.

Mail/IM records (e.g., mail/instant mail records) may include without limitation data related to messages that the user has transmitted in an email and/or an instant message.

Given this source data, the system may then build priors for each association pair. For example, assume the system has 4 classes to describe age (e.g., 0-18 years, 19-35 years, 36-50 years, and 51+ years) and 2 classes to describe gender (e.g., male and female). The system then has 6 components (e.g., age and gender being not mutually exclusive) of the demographic information. That is, a person may be a male or female, and will fall in one of four age categories. Then, for each of these 6 components, the system will have one prior associated with each dataset. For example, the correlation between browsing pattern and a male user and the correlation between browsing pattern and a teenage user are two of the six priors possible for the browsing pattern dataset.

Given this prior and a test user whose age and/or gender the system does not know but has information about the user's search history, browsing pattern and ad-click history, the system may estimate the probability of the user falling into a gender bucket and falling into an age bucket for each of the example six buckets. Note that the deductions for gender and age have to be done independent of each other, with each classification being associated with an accuracy and/or confidence number. There are standard machine learning techniques that the system may use to classify the input into multiple classes. Examples of such machine learning techniques include without limitation SVMs (support vector machines), neural networks and Bayesian techniques.

The system may then use a weighted consolidation scheme for arriving at the final confidence and/or accuracy for age and/or gender from the individual classifications. For example, if the system uses 3 datasets for learning algorithms, the system will preferably have 3 predictions of gender and three predictions of age. These weights used for consolidation may again be adjusted continuously based on a feedback mechanism and regret minimization techniques.

Example Operations for Deducing Shadow Profiles

Figure 2:
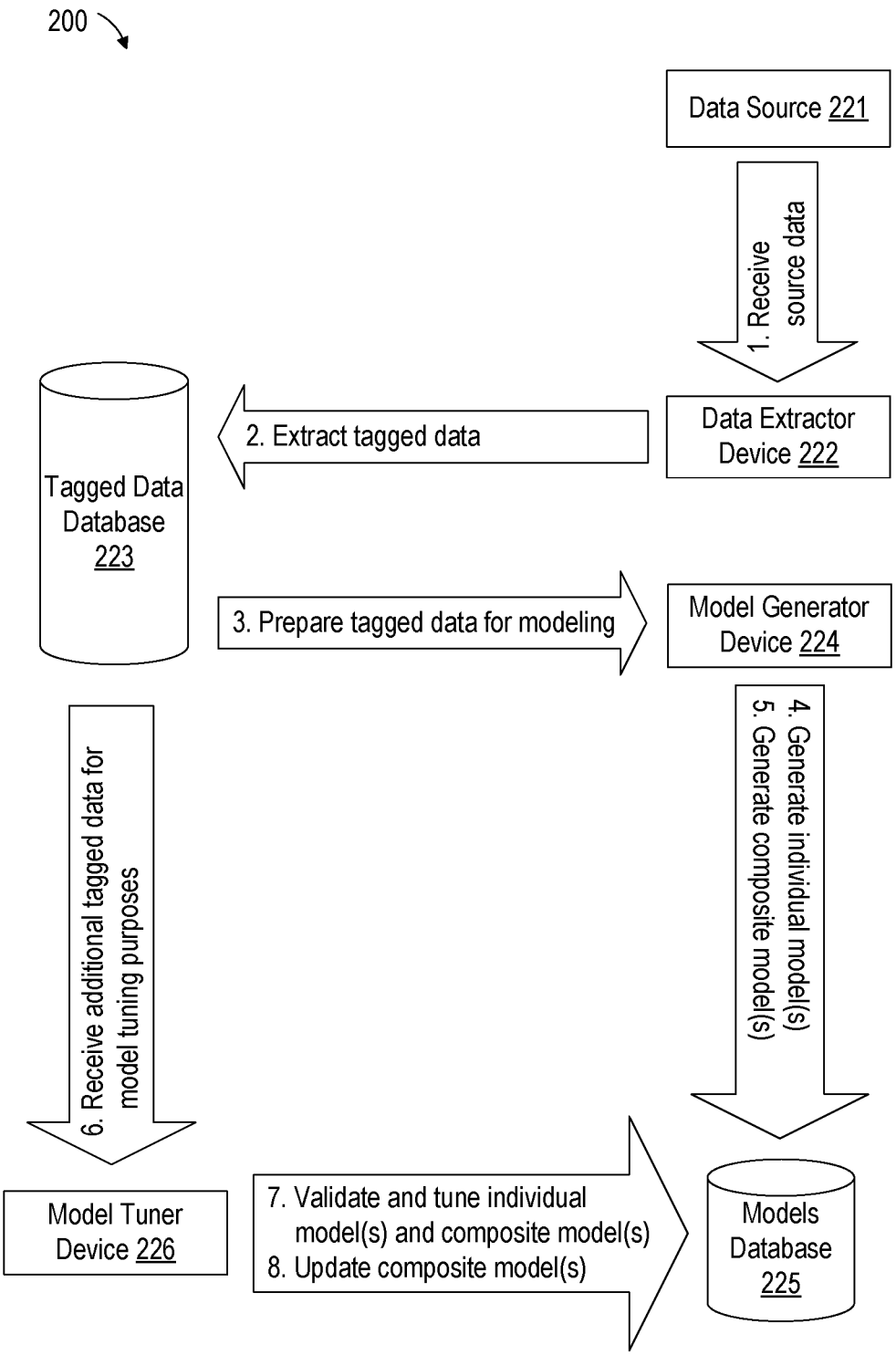
FIG. 2 is a schematic diagram for a system 200 for deducing shadow profiles, in accordance with some embodiments.

FIG. 2 is a schematic diagram for a system 200 for deducing shadow profiles, in accordance with some embodiments. The system 200 includes devices that are similar to some devices of the profile modeling system 120 of FIG. 1. In FIG. 2, assume that the system 200 is attempting to deduce shadow profiles (e.g., gender and/or age) for users who have not declared this information. For example, some users may have not filled-in their profile attributes during signup to the web portal.

The system 200 is configured for receiving source data. As mentioned above, the datasets used for the purpose of profile deduction may include without limitation the following source data:

1. Search history
2. Browsing pattern
3. Ad-click history
4. Group memberships of the web portal company
5. User expressed interests
6. Mail/IM (mail and/or instant message) records The data extractor device 222 is configured for extracting tagged data from the source data and storing the tagged data in a tagged data database 223. Listed below are examples of data extraction operations for gender; the extractions may be similar for age-group.

1. Extract the username, gender etc of all the users who have a declared gender in the data source 221 (e.g., source database). Assume there are 100,000 such users out of 1,000,000 total users. Let the system 200 represent the individual user by "u" and the set of extracted users as "U".

2. From the search logs of the web portal company extract the search history of all the users of set U. The search history actually gives the system 200 the set of keywords that the user has visited in the past. The system 200 further places the keywords in different categories and have a category count for each user belonging to set U. A category count for a given user indicates the no of times the user has searched for a keyword belonging to the category. Examples of categories include without limitation sports, finance, beauty products, etc.

3. Similarly, the system 200 generates categories from ad-click history using extracted search marketing logs and has a category count for each user belonging to set U.

4. A similar exercise is done for other datasets mentioned above, such as, for example, groups memberships, user expressed interests, and mail/IM records.

The extracted data is called tagged data because the data has the label information associated with the actual profile of the user and/or other information. A sample representation of data above may be in a tabular structure for each data source as shown in the following tables.

TABLE 1

Search History Data

| User ID | Category 1 Search Count | Category 2 Search Count | Category 3 Search Count |
|---|---|---|---|
| Amit | 1000 | 2000 | 3000 |

TABLE 2

Browsing Pattern Data

| User ID | Category 1 Browse Count | Category 2 Browse Count | Category 3 Browse Count |
|---|---|---|---|
| Amit | 1000 | 2000 | 3000 |

TABLE 3

Ad-Click History Data

| User ID | Category 1 Click Count | Category 2 Click Count | Category 3 Click Count |
|---|---|---|---|
| Amit | 1000 | 2000 | 3000 |

TABLE 4

Group Memberships History Data

| User ID | Category 1 Groups Count | Category 2 Groups Count | Category 3 Groups Count |
|---|---|---|---|
| Amit | 1000 | 2000 | 3000 |

TABLE 5

User Expressed History Data

| User ID | Category 1 Interest Count | Category 2 Interest Count | Category 3 Interest Count |
|---|---|---|---|
| Amit | 1000 | 2000 | 3000 |

TABLE 6

Mail/IM History Data

| User ID | Category 1 Mail/IM Count | Category 2 Mail/IM Count | Category 3 Mail/IM Count |
|---|---|---|---|
| Amit | 1000 | 2000 | 3000 |

The model generator device 224 is configured for preparing the tagged data for modeling. For example, as with most machine learning problems, the system 200 may split the tagged data into training data and test data. In later operations, the system 200 will also be using another dataset, called tuning data, which is also derived from the tagged data. Typically, training data, test data and tuning data includes, for example, about 80% training data, about 10% test data and about 10% tuning data of the total tagged data that the system 200 has extracted.

The model generator device 224 is further configured for generating one or more individual models and storing the individual models in the models database 225. For example, once the data for all the users belonging to set U is extracted, the system 200 needs to generate models for each of the sources of data.

The steps for generating an individual model for a given source of data may include without limitation the following:
1. Select categories that contribute to a predefined threshold percentage of total data.
2. Defining data points of a classifier based on the categories selected in the first step above, along with their corresponding values for each user.
3. Generate an output of the classifier from second step above. The output of the classifier are deduced attribute for a deduced profile for the particular user.
4. Generate models by using a machine learning techniques. Some of the possible techniques include without limitation the following: one or more decision trees, AdaBoost (Adaptive Boosting), and SVM (support vector machines). One model is preferably generated for each source dataset. In this example, there are preferably six models generated.

Once the machine learning algorithm is determined, the system 200 needs to train the models using training data. Accordingly, generating a model includes training the model to form associations between source data and profile attributes. For example, the model that predicts the gender based on search history involves an association of a particular model of behavior to males and another model of behavior to females. Given an anonymous profile whose search history is provided as input, the model generates a weight vector. Such a weight vector may be, for example, [m, f] where m is the probability of the profile belonging to a male and f is the probability of the profile being female, where m+f=1. Similarly, the system 200 has, for example, 6×2 models. That is, 6 sources and 2 attributes, gender and age. The system may use each shadow attribute to predict the profile for an anonymous user and map the attributes, for example, to 2×4 (2 values for gender, male and female, and 4 values for age group, assuming the system 200 is classifying profiles into 4 age groups).

The model generator device 224 is further configured for generating one or more composite models and storing the composite model(s) in the models database 225. For example, once the individual models (e.g., 1 model for each of the 6 source datasets) are generated, a composite model is generated by combining all of these individual models.

Initially, the system 200 assigns weights to the output of each individual model used for the same attribute. Each weight is based on the training error for each individual model. Lower training error should mean more weight for that particular model. As one of many examples, the system may use the following equation for the weight assigned to that particular model:

$$\text{Weight} = \sqrt{\frac{1 - \text{error}}{\text{error}}}. \qquad \text{Equation 1}$$

In Equation 1, the error is a training error between 0 and 1. With this weight, the system 200 preferably assigns a lesser weight to the individual models with higher training error, and assigned a greater weight to the individual models with lower training error.

For example, assume that the training of the models is completed and the system 200 starts using the models to deduce unknown profiles. Assume that all the models had similar training error and so had equal weights. A sample composite model for a particular user may be the following output:

TABLE 7

Shadow Profile Probabilities for a Sample User

| DATA SOURCE | GENDER [Male, Female] | AGE [0-18 years, 19-35 years, 36-50 years, 51+ years] |
|---|---|---|
| Search History | [0.8, 0.2] | [0.1, 0.3, 0.5, 0.1] |
| Browsing Pattern | [0.5, 0.5] | [0.2, 0.15, 0.4, 0.25] |
| Ad-Click History | [0.9, 0.1] | [0.1, 0.1, 0.7, 0.1] |
| Groups | [0.7, 0.3] | [0.2, 0.2, 0.4, 0.2] |
| User-Expressed Interests | [0.75, 0.25] | [0.1, 0.2, 0.6, 0.1] |
| Mail/IM Records | [0.6, 0.4] | [0.1, 0.3, 0.4, 0.2] |

Since the data sources are equally weighted, the system determines that the probability that the user is male is (0.8+0.5+0.9+0.7+0.75+0.6)/6=0.7, and the probability that the user is female is therefore 0.3. Similarly, for the various age groups, the final probabilities are (0.13, 0.21, 0.5, 0.16). The system 200 may then predict that the user is, for example, male/middle-age with the respective confidence.

The accuracy of each model determines if the model is included in the composite model. The confidence of prediction of each model determines their respective weight in the composite model. The confidence is used to reinforce the weights originally computed using primarily the training error.

The model tuner device 226 is configured for receiving additional tagged data and validating the individual model(s) and the composite model(s). For example, once the composite model is complete, the system 200 runs the composite model through the tuning data to tune the weights of composite model's constituents. The system 200 uses accuracy rates and error rates of the composite model to alter and tune the weights of the individual models.

The system 200 validates the composite model with the test data to compute the accuracy and confidence of the composite. If the accuracy is less than the required threshold limit, the system repeats aforementioned operations, for example, by using a different data aggregation technique or by changing the machine learning algorithm used until the system 200 has the composite model having accuracy greater than a predefined threshold limit.

The model tuner device 226 is further configured for updating the composite model(s) by using one or more incremental machine learning techniques. An advantage here is that the system 200 gathers tagged data even after the system 200 starts using profile detection techniques on real data. This tagged data is from users who sign up with complete profile information. The system 200 may use the actual profile and the deduced shadow profile to compare and tune the individual model(s) and also the composite model(s).

This technique of modifying the model using tagged data after the model is trained may be referred to as incremental learning. For example, as the system 200 continues to use these models to predict age and/or gender, the system 200 may construct a feedback model by using profiles of new users who do specify their gender and age during, for example, a signup operation. The system 200 compares the profile deduced by the models to those profiles specified by this set of users. Models that have a comparatively lower error rate are then weighted higher than those with higher error rates.

For example, over a time period, the system 200 may use the feedback to set the following weights for the data sources for each attribute:

TABLE 8

Shadow Profile Weights for a Sample User

| DATA SOURCE | GENDER WEIGHT | AGE WEIGHT |
|---|---|---|
| Search History | 0.30 | 0.12 |
| Browsing Pattern | 0.10 | 0.17 |
| Ad-Click History | 0.22 | 0.27 |
| Groups | 0.08 | 0.05 |
| User-Expressed Interests | 0.13 | 0.19 |
| Mail/IM Records | 0.17 | 0.20 |

Given these weights, the system may combine the prediction from the previous model, in a weighted fashion, to produce the profile vector [0.74, 0.26] for gender and the profile vector [0.1049, 0.1965, 0.531, 0.1676] for age.

There are multiple methods to combine the outputs of the models and the above is just one example, which is a weighted average model. Similarly, there are other more advanced methods, like support vector machines, which may be used in each of the models that would increase the accuracy of the models. Other techniques exist as well.

Overview of Method for Deducing Shadow Profiles

Figure 3:
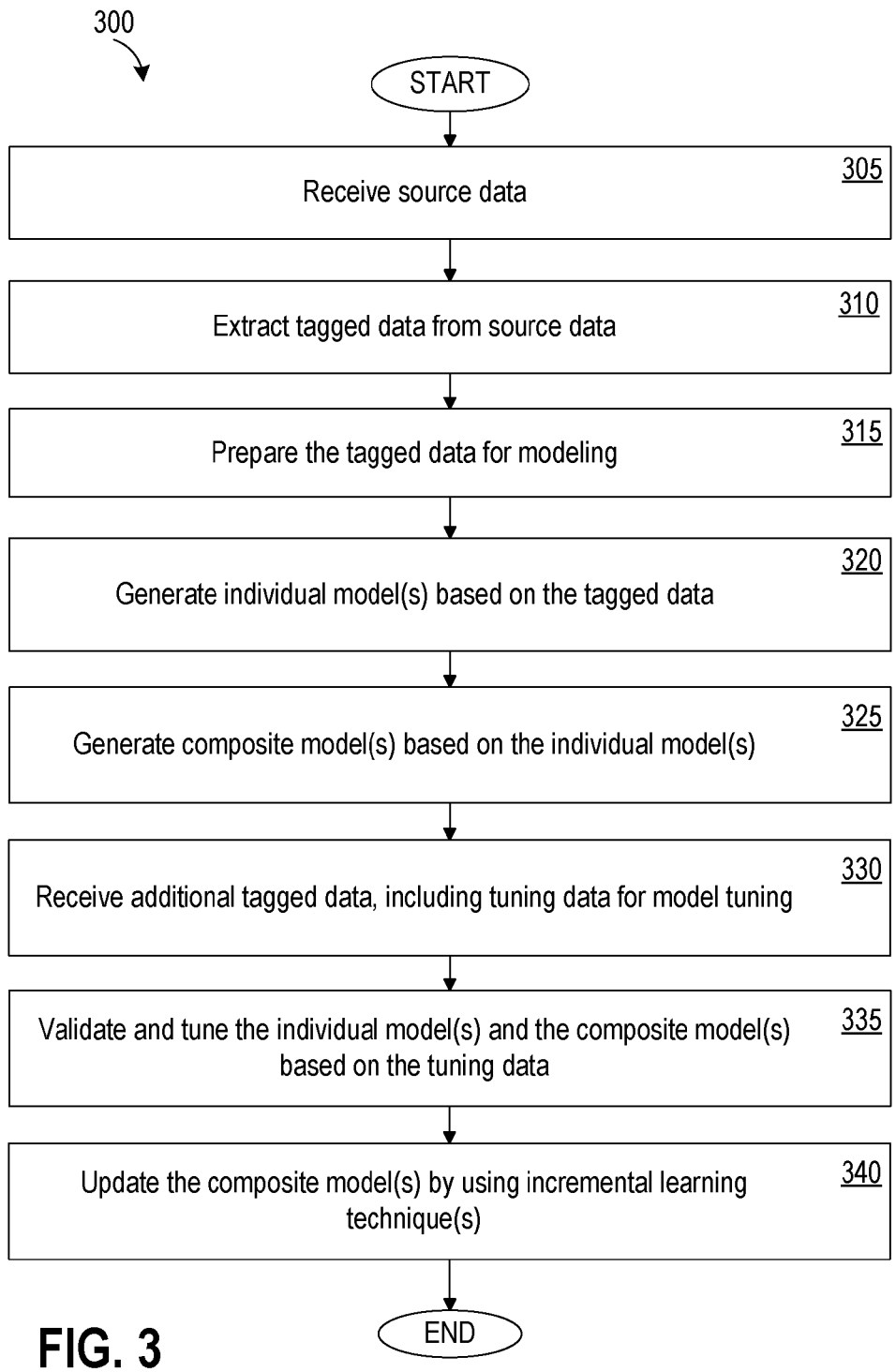
FIG. 3 is a flowchart of a method 300 for deducing shadow profiles, in accordance with some embodiments.

FIG. 3 is a flowchart of a method 300 for deducing shadow profiles, in accordance with some embodiments. The steps of the method 300 may be carried out by one or more devices of the system 100 of FIG. 100 or the system 200 of FIG. 2.

The method 300 starts in a step 305 where the system receives source data. For example, the system receives source data that may include without limitation search history, browsing pattern, ad-click history, group memberships, user-expressed interests, and mail/IM records.

The method 300 moves to a step 310 where the system extracts tagged data from the source. For example, the system may extract tagged data and store the tagged data in a database.

The method 300 proceeds to a step 315 where the system prepares the extracted data for modeling. For example, the system may split the tagged data into training datasets, test datasets and/or tuning datasets.

Next, in a step 320, the system generates one or more individual models based on the tagged data. The one or more individual models provide the ability to deduce attributes of a profile for the user. For example, generating individual models may involve selecting the appropriate machine learning algorithm and training the individual models.

The method 300 then moves to a step 325 where the system generates one or more composite models based on the individual models. For example, generating a composite model may involve assigning weights to attributes in the individual models and then outputting a composite model. The system may charge a premium for ad campaigns that are aimed at target users who are each assigned one or more shadow profile attribute values. The system may determine the premium based on the confidence level with which the one or more attribute values fits to the one or more users. The system is applicable to both display advertising and sponsored search advertising.

Then, in a step 330, the system receives additional tagged data, including without limitation tuning data for model tuning. For example, the additional tagged data may include tuning data for later model tuning operations.

The method 300 then proceeds to a step 335 where the system validates and tunes the individual model(s) and the composite model(s) based on the tuning data. For example, the system may use accuracy rates and error rates of the composite model to alter and tune the weights of the individual models.

Next, in a step 340, the system updates the composite model(s) by using incremental learning techniques. For example, the system gathers tagged data even after the system starts using profile detection techniques on real data. This tagged data is from users who sign up with complete profile information. The system may use the actual profile and the deduced shadow profile to compare and tune the individual model(s) and also the composite model(s). The method 300 concludes after the step 340.

Note that the method 300 may include other details and steps that are not discussed in this method overview. Other details and steps are discussed with reference to the appropriate figures and may be a part of the method 300, depending on the embodiment.

Exemplary Network, Client, Server and Computer Environments

Figure 4:
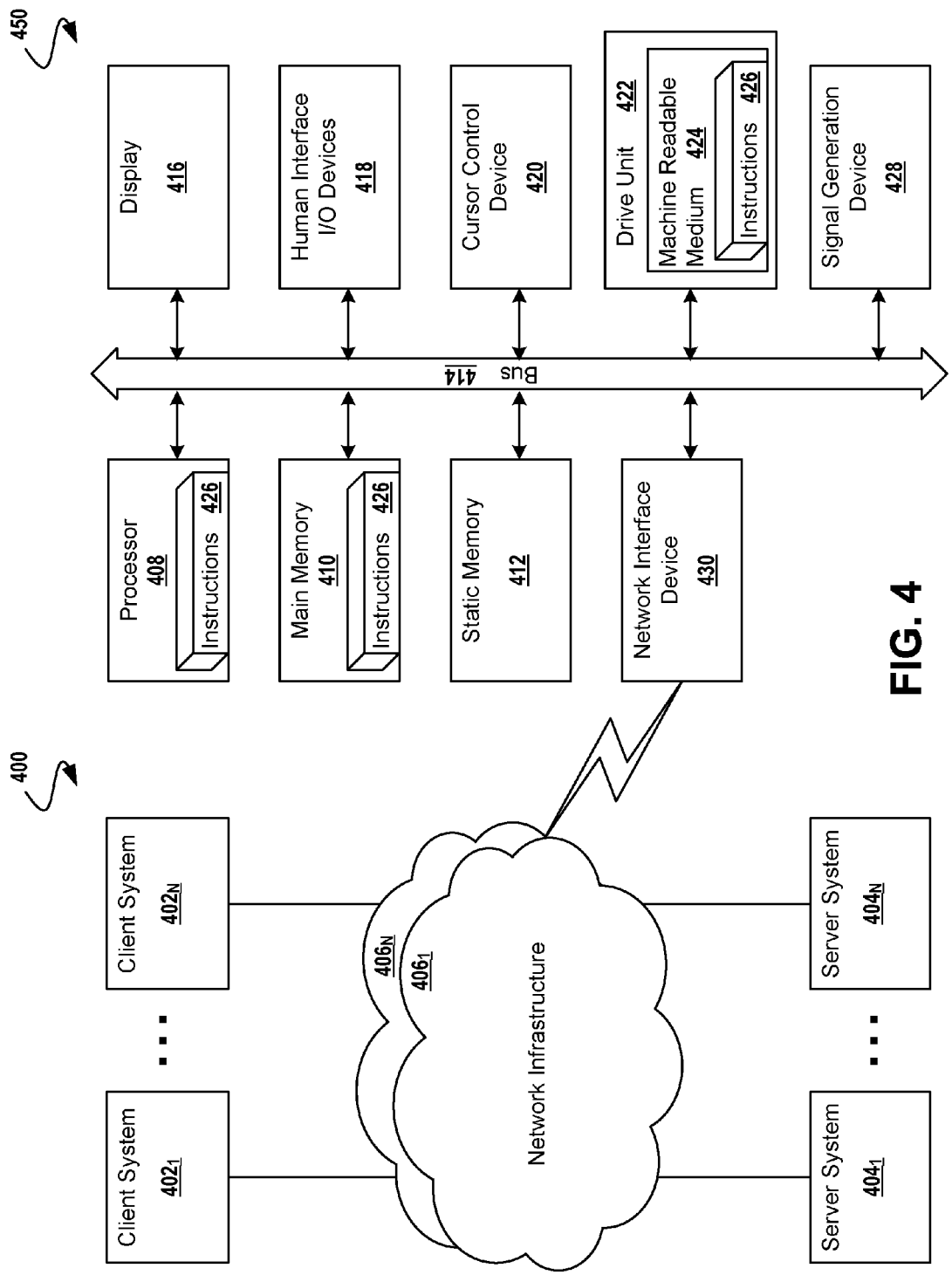
FIG. 4 is a diagrammatic representation of a network, including nodes that may comprise a machine within which a set of instructions may be executed, in accordance with some embodiments.

FIG. 4 is a diagrammatic representation of a network 400, including nodes for client systems $402_1$ through $402_N$, nodes for server systems $404_1$ through $404_N$, nodes for network infrastructure $406_1$ through $406_N$, any of which nodes may comprise a machine 450 within which a set of instructions, for causing the machine to perform any one of the techniques discussed above, may be executed. The embodiment shown is exemplary, and may be implemented in the context of one or more of the figures herein.

Any node of the network 400 may comprise a general-purpose processor, a digital signal processor (DSP), an application specific integrated circuit (ASIC), a field programmable gate array (FPGA) or other programmable logic device, discrete gate or transistor logic, discrete hardware components, or any combination thereof capable to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration, etc).

In alternative embodiments, a node may comprise a machine in the form of a virtual machine (VM), a virtual server, a virtual client, a virtual desktop, a virtual volume, a network router, a network switch, a network bridge, a personal digital assistant (PDA), a cellular telephone, a Web appliance, or any machine capable of executing a sequence of instructions that specify actions to be taken by that machine. Any node of the network may communicate cooperatively with another node on the network. In some embodiments, any node of the network may communicate cooperatively with every other node of the network. Further, any node or group of nodes on the network may comprise one or more computer systems (e.g., a client computer system, a server computer system) and/or may comprise one or more embedded computer systems, a massively parallel computer system, and/or a cloud computer system.

The computer system 450 includes a processor 408 (e.g., a processor core, a microprocessor, a computing device, etc.), a main memory 410 and a static memory 412, which communicate with each other via a bus 414. The machine 450 may further include a display unit 416 that may comprise a touchscreen, or a liquid crystal display (LCD), or a light emitting diode (LED) display, or a cathode ray tube (CRT). As shown, the computer system 450 also includes a human input/output (I/O) device 418 (e.g. a keyboard, an alphanumeric keypad, etc), a pointing device 420 (e.g., a mouse, a touch screen, etc), a drive unit 422 (e.g., a disk drive unit, a CD/DVD drive, a tangible computer readable removable media drive, an SSD storage device, etc.), a signal generation device 428 (e.g., a speaker, an audio output, etc.), and a network interface device 430 (e.g., an Ethernet interface, a wired network interface, a wireless network interface, a propagated signal interface, etc.).

The drive unit 422 includes a machine-readable medium 424 on which is stored a set of instructions 426 (e.g., software, firmware, middleware, etc.) embodying any one, or all, of the methodologies described above. The set of instructions 426 is also shown to reside, completely or at least partially, within the main memory 410 and/or within the processor 408. The set of instructions 426 may further be transmitted or received via the network interface device 430 over the network bus 414.

It is to be understood that embodiments of this invention may be used as, or to support, a set of instructions executed upon some form of processing core (such as the CPU of a computer) or otherwise implemented or realized upon or within a machine- or computer-readable medium. A machine-readable medium includes any mechanism for storing or transmitting information in a form readable by a machine (e.g., a computer). For example, a machine-readable medium includes read-only memory (ROM); random access memory (RAM); magnetic disk storage media; optical storage media; flash memory devices; electrical, optical or acoustical or any other type of media suitable for storing information.

Advantages

It has been shown how a web portal company may increase the user base that is available for profile-based aimed advertising. This will result in more satisfied advertisers, more satisfied users, and lead to greater revenues and profits for web portal company. The system increases the user base that is available for aimed advertising campaigns. The system caters to both emotional-brand advertising ad campaigns as well as performance-based ad campaigns. The system increases return on investment for an advertiser. The system provides greater satisfaction to users. The system increases revenue for a web portal company via the viral network effect of satisfied advertisers.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A computer-implemented method for deducing one or more user profile attributes using a shadow profile, the method comprising:

extracting, at a computer, tagged data from source data, wherein the tagged data comprises label information associated with an actual profile for a user, and wherein the tagged data is associated with the user;

preparing, at a computer, the tagged data by splitting the tagged data into datasets, including at least training data and test data;

generating, at a computer, one or more individual models based on the tagged data, wherein the one or more individual models provide the ability to deduce attributes of a profile for the user;

testing, at a computer, the one or more individual models using the test data to determine a confidence level representing the predicted accuracy of the individual model;

generating, at a computer, a composite model based on the individual models, wherein the composite model comprises a combination of the individual models that are associated with the user and achieve a confidence level which is greater than a predefined threshold value;

generating, at a computer, a plurality of values associated with a user profile attribute using the composite model;

storing, at a computer, the plurality of values associated with a user profile attribute in a shadow profile associated with the user, wherein the shadow profile comprises a plurality of attributes, each attribute comprising at least one value and at least one confidence level;

updating, at a computer, the at least one confidence level of the shadow profile based on new or modified label information associated with the actual profile; and exposing, at a computer, at least one attribute associated with a shadow profile to facilitate the selection of an advertisement to present to the user associated with the shadow profile.

2. The method of claim 1, further comprising at least one of:
receiving, at a computer, additional tagged data, including tuning data for model tuning;
validating, at a computer, the one or more individual models;
validating, at a computer, the composite model;
tuning, at a computer, the one or more individual models; and
tuning, at a computer, the composite model.

3. The method of claim 1, wherein the source data includes at least one of:
search history;
browsing pattern;
item-click history;
group memberships;
user-expressed interests;
mail records; and
instant message records.

4. The method of claim 1, wherein the tagged data includes information associated with at least one of:
gender;
age group; and
income level.

5. The method of claim 2, wherein the tagged data includes total tagged data, and wherein the training data includes about 80% of the total tagged data, and wherein the test data includes about 10% of the total tagged data, and wherein the tuning data includes about 10% of the total tagged data.

6. The method of claim 1, wherein generating one or more individual models includes at least one of:
selecting, at a computer, categories that contribute to a predefined threshold percentage of total data;
defining, at a computer, data points of a classifier based on the categories;
generating, at a computer, an output of the classifier, wherein the output is a deduced profile for the user; and
generating, at a computer, one or more individual models by using machine learning techniques.

7. The method of claim 1, wherein generating one or more individual models includes using, at a computer, a machine learning technique that includes at least one of:
one or more decision trees;
AdaBoost; and
support vector machines.

8. The method of claim 1, wherein generating one or more individual models includes training, at a computer, the one or more individual models by using training data, wherein training includes training the one or more individual models to form associations between source data and profile attributes.

9. The method of claim 1, wherein generating the composite model includes at least one of:
assigning, at a computer, a weight to each output of each individual model, wherein each weight is based on a training error for each individual model;
assigning, at a computer, a lesser weight to individual models with higher training error; and
assigning, at a computer, a greater weight to individual models with lower training error.

10. The method of claim 1, further comprising updating, at a computer, the composite model by using an incremental learning technique.

11. A system for deducing one or more user profile attributes, the system comprising:
a computer system configured for:
extracting tagged data from source data using a shadow profile, wherein the tagged data comprises label information associated with an actual profile for a user, and wherein the tagged data is associated with the user;
preparing the tagged data by splitting the tagged data into datasets, including at least training data and test data;
generating one or more individual models based on the tagged data, wherein the one or more individual models provide the ability to deduce attributes of a profile for the user;
testing the one or more individual models using the test data to determine a confidence level representing the predicted accuracy of the individual model;
generating a composite model based on the individual models, wherein the composite model comprises a combination of the individual models that are associated with the user and achieve a confidence level which is greater than a predefined threshold value;
generating a plurality of values associated with a user profile attribute using the composite model;
storing the plurality of values associated with a user profile attribute in a shadow profile associated with the user, wherein the shadow profile comprises a plurality of attributes, each attribute comprising at least one value and at least one confidence level;
updating the at least one confidence level of the shadow profile based on new or modified label information associated with the actual profile; and
exposing at least one attribute associated with a user profile to facilitate the selection of an advertisement to present to the user.

12. The system of claim 11, wherein the computer system is further configured for:
receiving additional tagged data, including tuning data for model tuning;
validating the one or more individual models;
validating the composite model;
tuning the one or more individual models; and
tuning the composite model.

13. The system of claim 11, wherein the source data includes at least one of:
search history;
browsing pattern;
item-click history;
group memberships;
user-expressed interests;
mail records; and
instant message records.

14. The system of claim 11, wherein the tagged data includes information associated with at least one of:
gender;
age group; and
income level.

15. The system of claim 12, wherein the tagged data includes total tagged data, and wherein the training data includes about 80% of the total tagged data, and wherein the test data includes about 10% of the total tagged data, and wherein the tuning data includes about 10% of the total tagged data.

16. The system of claim 11, wherein generating one or more individual models further configures the computer system for at least one of:
selecting categories that contribute to a predefined threshold percentage of total data;

defining data points of a classifier based on the categories;
generating an output of the classifier, wherein the output is a deduced profile for the user; and
generating one or more individual models by using machine learning techniques.

17. The system of claim 11, wherein generating one or more individual models further configures the computer system for using a machine learning technique that includes at least one of:
one or more decision trees;
AdaBoost; and
support vector machines.

18. The system of claim 11, wherein generating one or more individual models further configures the computer system for training the one or more individual models by using training data, wherein training includes training the one or more individual models to form associations between source data and profile attributes.

19. The system of claim 11, wherein generating the composite model further configures the computer system for at least one of:
assigning a weight to each output of each individual model, wherein each weight is based on a training error for each individual model;
assigning a lesser weight to individual models with higher training error; and
assigning a greater weight to individual models with lower training error.

20. The system of claim 11, wherein the computer system is further configured for updating the composite model by using an incremental learning technique.

21. A non-transitory computer readable storage medium comprising one or more instructions for deducing one or more user profile attributes, wherein the one or more instructions are configured for causing one or more processors to perform the steps of:
extracting tagged data from source data, wherein the tagged data comprises label information associated with an actual profile for a user, and wherein the tagged data is associated with the user;
preparing the tagged data by splitting the tagged data into datasets, including at least training data and test data;
generating one or more individual models based on the tagged data, wherein the one or more individual models provide the ability to deduce attributes of a profile for the user;
testing the one or more individual models using the test data to determine a confidence level representing the predicted accuracy of the individual model;
generating a composite model based on the individual models, wherein the composite model comprises a combination of the individual models that are associated with the user and achieve a confidence level which is greater than a predefined threshold value;
generating a plurality of values associated with a user profile attribute using the composite model;
storing the plurality of values associated with a user profile attribute in a shadow profile associated with the user, wherein the shadow profile comprises a plurality of attributes, each attribute comprising at least one value and at least one confidence level;
updating the at least one confidence level of the shadow profile based on new or modified label information associated with the actual profile; and
exposing at least one attribute associated with a user profile to facilitate the selection of an advertisement to present to the user.

* * * * *